J. BODA.
CORN GATHERING MACHINE.
APPLICATION FILED JULY 13, 1908.

923,806.

Patented June 8, 1909.

Witnesses
Edward T. Wray
J. S. Abbott

Inventor
Joseph Boda
by Burton & Burton
his Attys.

UNITED STATES PATENT OFFICE.

JOSEPH BODA, OF PLANO, ILLINOIS, ASSIGNOR TO INDEPENDENT HARVESTER COMPANY, OF PLANO, ILLINOIS, A CORPORATION OF MAINE.

CORN-GATHERING MACHINE.

No. 923,806.  Specification of Letters Patent.  Patented June 8, 1909.

Application filed July 13, 1908. Serial No. 443,271.

*To all whom it may concern:*

Be it known that I, JOSEPH BODA, a citizen of the United States, residing at Plano, in the county of Kendall and State of Illinois, have invented new and useful Improvements in Corn-Gathering Machines, of which the following is a specification, reference being had to the drawings forming a part thereof.

This invention relates to machines for gathering corn from stalks in the field, and particularly to the rolls between which the stalks are engaged and by which the ears are broken or snapped from them.

It consists in the features of construction described and shown as indicated in the claims.

Figure 1:
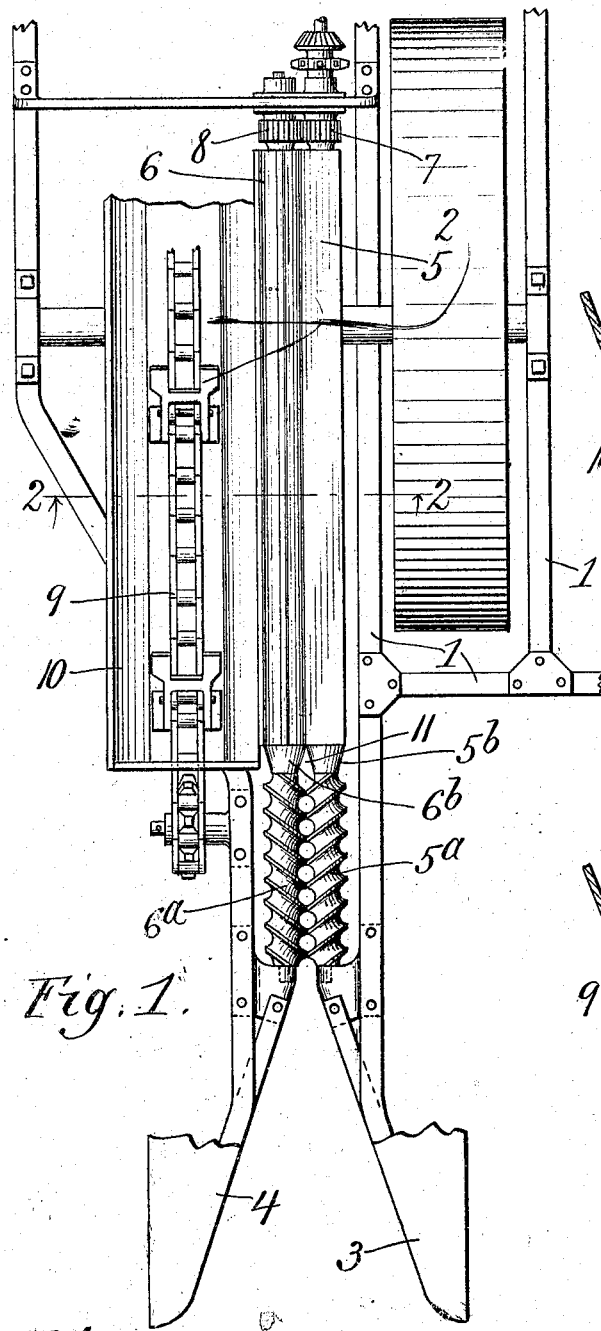
Figure 2:
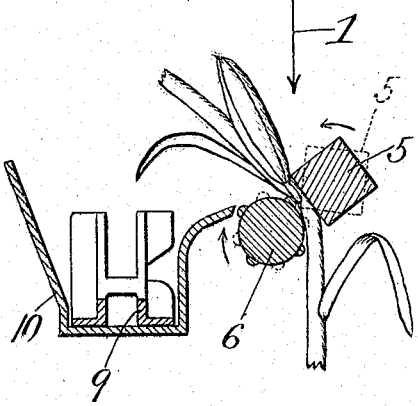
Figure 3:
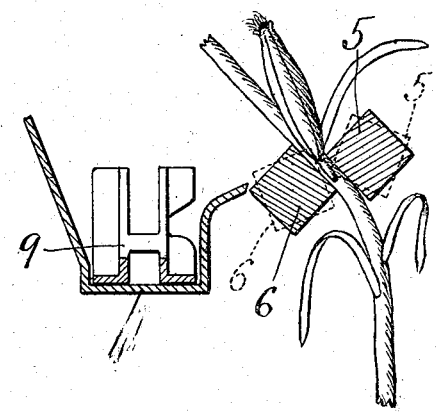

In the drawings:—Figure 1 is a direct plan view looking in the direction of the arrow, 1, on Fig. 2, showing the snapping rolls embodying this invention and their immediate supports and connecting gears. Fig. 2 is a section at the line 2—2 on Fig. 1. Fig. 3 is a transverse section of the rolls showing a modification in their form.

The drawings show only so much of the corn-gathering machine frame as is necessary to locate and show in connection therewith the parts pertaining to this invention, the frame, 1, encompassing the traction wheel, 2, having secured to it in any suitable manner, not shown in detail by the drawings, the gathering arms, 3 and 4, on which are mounted the snapping rolls, 5 and 6, geared together at their rear upper ends, as indicated by the intermeshing gears, 7 and 8, and driven by any suitable connection with the traction wheel, such connection not being shown in the drawings. The rolls are mounted in the customary relation to the conveyer, 9, which runs in the trough, 10, mounted on the outer gathering arm, 4, for receiving and conveying up rearward the ears as they are detached from the stalks by the snapping rolls.

The distinguishing feature of the invention consists in the form of the snapping rolls, one of which is square, and both of which may be square, as shown in the modified construction illustrated in Fig. 3. If only one of the rolls is square, preferably the inner and higher one is so made, as shown in Figs. 1 and 2, and the two rolls in that case are mounted with their axes at such a distance apart that the corners of the square roll revolve close enough to the cylindrical surface of the round roll to cause the stalks to be somewhat firmly grasped between the two rolls at this point; and this causes the grasp to be relaxed at intermediate points in the rotation of the square roll so that the stalks are drawn through longitudinally between the rolls at these intermediate points until the ears reach the rolls, stopping against them until the next corner of the square roll comes around and snaps off the ear, which falls over the round roll into the conveyer trough.

When both rolls are square, as shown in Fig. 3, they are mounted with their axes somewhat nearer together, and are relatively disposed about their axes so that the corners of each roll, at the point of closest approximation to the opposite roll, face the middle point of the proximate side of such opposite roll. With this construction, the interval between the two rolls is widest and the grasp upon the stalk least at the points at which the planes containing their two axes cuts the two rolls midway between the corners and the middle point of the sides, this condition occurring eight times in the course of each revolution, alternating with eight instances of closest approach of the two rolls,—when the square corner of one faces the middle point of the side of the other. The operation of the rolls in this form is substantially the same as in the other form,— namely, that the stalks have an opportunity to slide or be drawn longitudinally between the rolls at the points of minimum grasp, the ears being stopped on the rolls until the corners come around and snap them off.

For initially engaging the stalks, the rolls 5 and 6, at their lower and forward ends are spirally fluted, as seen at $5^a$, $6^a$, this portion of the rolls being of uniform diameter,— that is, without taper,—and the spiral fluting being identical in pitch and dimensions of the grooves and ribs on the two rolls, said grooves and ribs being also similarly located on the two rolls so that as the rolls revolve the spiral ribs of the roll are directly opposed continuously to the spiral ribs of the other roll, the intervening grooves also facing each other and thereby inclosing between them a space in which the stalks are engaged and retained while being fed by the spiral ribs up rearwardly along the rolls as the latter revolve, to the rear limit of the spiral fluting; and at this point the rolls are formed conically tapering for a short distance, $5^b$, $6^b$, to the commencement of the snapping portion of the rolls,—that is, the square portion of one and the cylindrical portion of the other when they are not both square at this part,—the diameter of said tapered portions at the smaller end being substantially that of the fluted portion of the rolls at the bottom of the fluting grooves. This tapering form of the two rolls results in a tapering entrance path, 11, between the rolls by which the stalks are introduced between the ear-snapping portion of the rolls, each stalk being crowded on by the stalk in front of it as they successively emerge from the fluting grooves.

I claim:—

1. In a corn-gathering machine, snapping rolls mounted for receiving the stalks between them, and means for rotating the rolls synchronously toward each other, one of the rolls being mounted with its axis higher than that of the other roll and being square in cross section.

2. In a corn-gathering machine, a pair of snapping rolls and means by which they are carried in position for engaging the stalks between them, one of said rolls being mounted with its axis higher than the other, the lower roll being cylindrical and the higher roll being square in cross section, and means for revolving the rolls synchronously toward each other.

3. In a corn-gathering machine, stalk engaging and snapping rolls mounted for receiving the stalks between them at their forward ends, and means for rotating the rolls synchronously toward each other, both rolls having a rear ear-detaching portion and a forward end portion which is spirally fluted, and an intermediate portion reduced in diameter to the diameter of the fluted portion at the bottom of the fluted grooves, and thence tapered widening rearwardly to the full diameter of the rear portion to form between them at the rear of the fluted portion a triangular entrance way to the ear-detaching portion.

In testimony whereof, I have hereunto set my hand, in the presence of two witnesses, at Plano, Illinois, this 9th day of July, 1908.

JOSEPH BODA.

In the presence of:—
W. H. LONG,
A. M. EASTON.